United States Patent [19]
Brown

[11] Patent Number: 5,195,461
[45] Date of Patent: Mar. 23, 1993

[54] FENCED DOG FEEDER

[75] Inventor: T. Walter Brown, Chickamauga, Ga.

[73] Assignees: Brown Fence Company, Chattanooga, Tenn.; Circle A Chain Link Fence Company, Marietta, Ga. ; part interest to each

[21] Appl. No.: 954,165

[22] Filed: Sep. 29, 1992

[51] Int. Cl.$^5$ ............................................. A01K 5/01
[52] U.S. Cl. ................................................... 119/61
[58] Field of Search ....................... 119/61, 52.1, 52.4, 119/54, 72, 75, 58; 49/171; 109/58.5

[56] References Cited

U.S. PATENT DOCUMENTS

| | | | |
|---|---|---|---|
| 1,101,338 | 6/1914 | Schroer | 49/171 |
| 3,046,939 | 7/1962 | Vlach | 119/61 |
| 3,362,382 | 1/1968 | Frasier | 119/58 |

FOREIGN PATENT DOCUMENTS 93793  12/1938  Finland .................................. 119/61

*Primary Examiner*—Gene Mancene
*Assistant Examiner*—Thomas Price
*Attorney, Agent, or Firm*—Alan Ruderman

[57] ABSTRACT

A feeder for animals is mountable in a chain-link wire fence or gate, the feeder having a cage including a substantially rectangular front frame abutting the front surface of the fence or gate and includes an opening through which one or two feed dishes may enter and be supported on struts forming the floor of the cage. A rear substantially rectangular frame member abuts the rear surface of the fence or gate and is connected to the front frame member to secure the feeder to the fence or gate, the cage extending through an opening in the rear frame member. The cage includes a number of other struts for preventing the feed dish or dishes from being removed from the cage except through the front frame. Lock rods removably slidable in rings at the front of the frame preclude the dishes from being pushed out the front of the cage. The cage includes a divider so that two separate feed dishes may separately be inserted and removed from the cage. A sleeve is secured to the rear of the cage for receiving a support bar which may abut the ground or mount to the gate frame to provide additional support to the cage.

7 Claims, 2 Drawing Sheets

FENCED DOG FEEDER

BACKGROUND OF THE INVENTION

This invention relates to apparatus for feeding a fenced dog or the like from outside the fenced enclosure, and more particularly to a feeder cage mounted in and carried by a chain-link or other fence or fence gate, the feeder cage being adapted to support one or more feeding dishes within the fenced enclosure.

The feeding and/or watering of a dog or other animal fenced within a pen or similar closure normally requires that one enter within the closure. The animal sometimes is playful or aggressive and it is not advisable to enter when wearing clean or dress clothes. There are times, however, when this may be unavoidable. Additionally, sometimes the animal will carry the food dish across the pen requiring a search of the enclosure when the dish is to be retrieved.

Although there have been prior proposals to solve this problem by mounting a feed dish in an opening in the fence, these proposals suffer from various deficiencies. For example, in Culp U.S. Pat. No. 1,879,332 fence mounting plates have openings corresponding in size and shape to the feeding dish and there is a U-shape channel member secured to one of the plates for receiving a rolled edge flange of the dish. Thus other size or shape dishes cannot be utilized nor can both a feed dish and a water dish be used simultaneously Additionally, there is little support for the dish because the dish is supported by the channel member and a spring biased flap or door against which the dish partially rests when the flap is disposed in the support position. In any event, the structure precludes the simultaneous mounting of both a feed dish and a water dish. In Stahler U.S. Pat. No. 2,478,430 apparatus is limited to a single feed dish having a semi-circular configuration. Porter U.S. Pat. No. 3,160,140 mounts two dishes on the door of a small cage, the door, however, being specifically configured for this purpose and in a manner not practicable for a conventional chain-link or other wire fence. Another such feeding device is shown in Daniel et al U.S. Pat. No. 3,361,116.

SUMMARY OF THE INVENTION

Consequently, it is a primary object of the present invention to provide an animal feeder including a feeder cage for mounting on and in a chain-link fence or gate, the feeder cage being capable of carrying one or two feed dishes.

It is another object of the present invention to provide an animal feeder mountable on a chain-link or other wire fence or gate, the feeder including a feed cage having a substantially rectangular frame member including a central opening for receiving one or two feed dishes which are entrapped in the cage but present food and/or water to an animal within the fence.

It is a further object of the present invention to provide an animal feeder mountable on a chain-link or other wire fence or gate, the feeder having a substantially rectangular front frame member including a central opening and a plurality of struts extending rearwardly from the frame member about the opening, the struts being connected to other brace members to form a cage within which one or two feeder dishes may be disposed for presenting food and/or water to an animal, the struts and braces being receivable within an opening in a second frame member cooperating with the first frame member to clasp the feeder to the fence or gate.

Accordingly, the present invention provides an animal feeder, particularly for dogs, mountable in a chain-link wire fence or gate, the feeder having a cage including a substantially rectangular front frame member mounted in abutting relationship with the front surface of the fence or gate and includes an opening through which one or two feed dishes may enter for positioning on rod struts forming the floor of the cage. Another or rear substantially rectangular frame member abuts the rear surface of the fence or gate and is connected to the front frame member to secure the feeder to the fence or gate, the cage extending through an opening in the rear frame member. The cage also includes a plurality of other rod struts for preventing the feed dish or dishes from being removed from within the cage except through the front frame. Lock handles removably slidable in rings on the front frame preclude the dishes from inadvertently being pushed out of the cage.

Preferably the cage includes a divider so that two separate feed dishes may separately be inserted and removed from the cage. The floor struts and other rearwardly extending struts are fixedly attached to the front frame member spaced about the opening and are received through the opening in the rear frame member which acts to clamp the fence or gate between the two frame members. A sleeve is affixed to the rear of the cage for receiving a support bar which may abut the ground or mount to the gate frame thereby to provide additional support for the weight of the food dishes.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
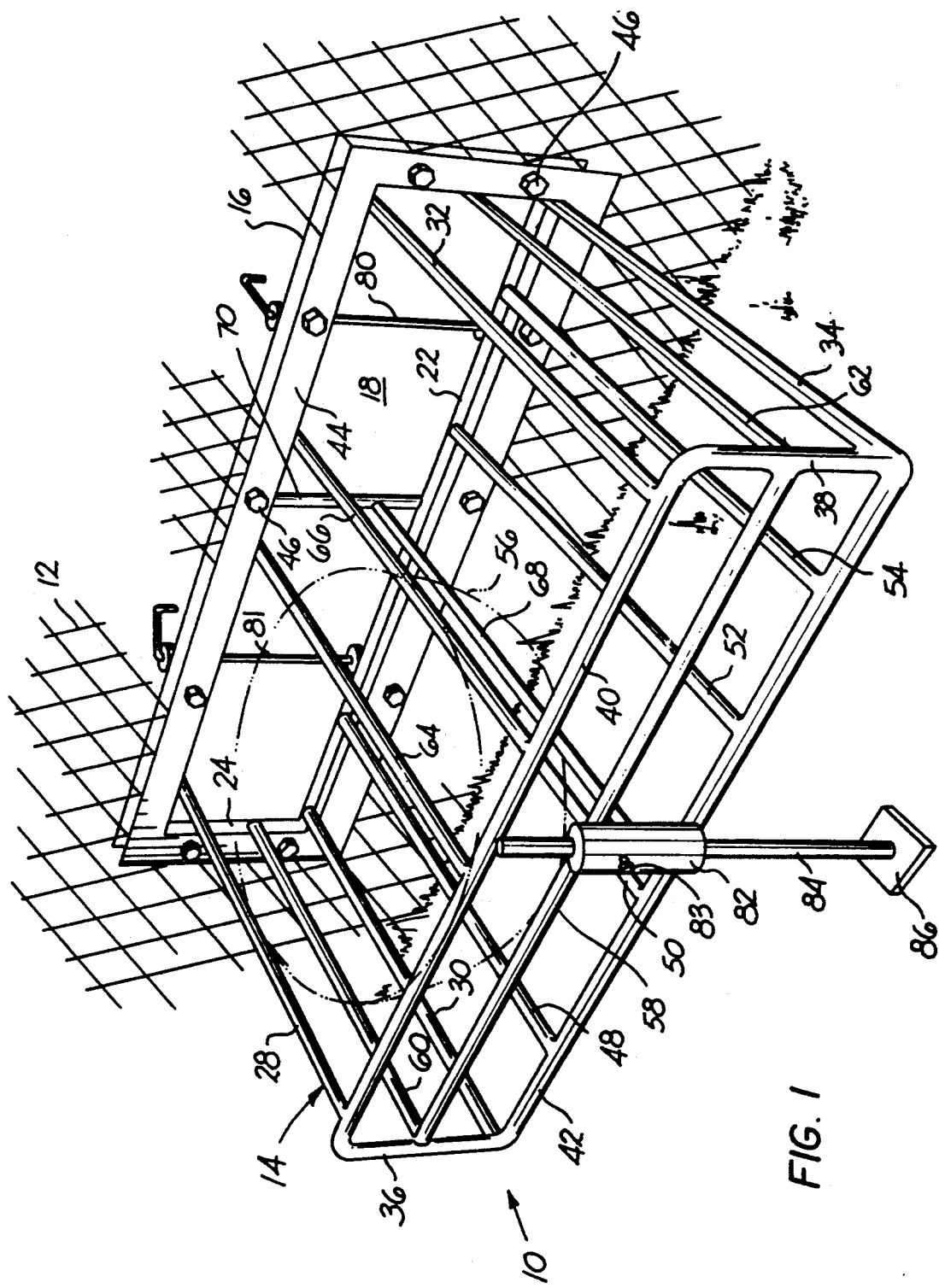
FIG. 1 is a rear perspective view of a dog feeder of the present invention mounted on a chain-link fence.
Figure 2:
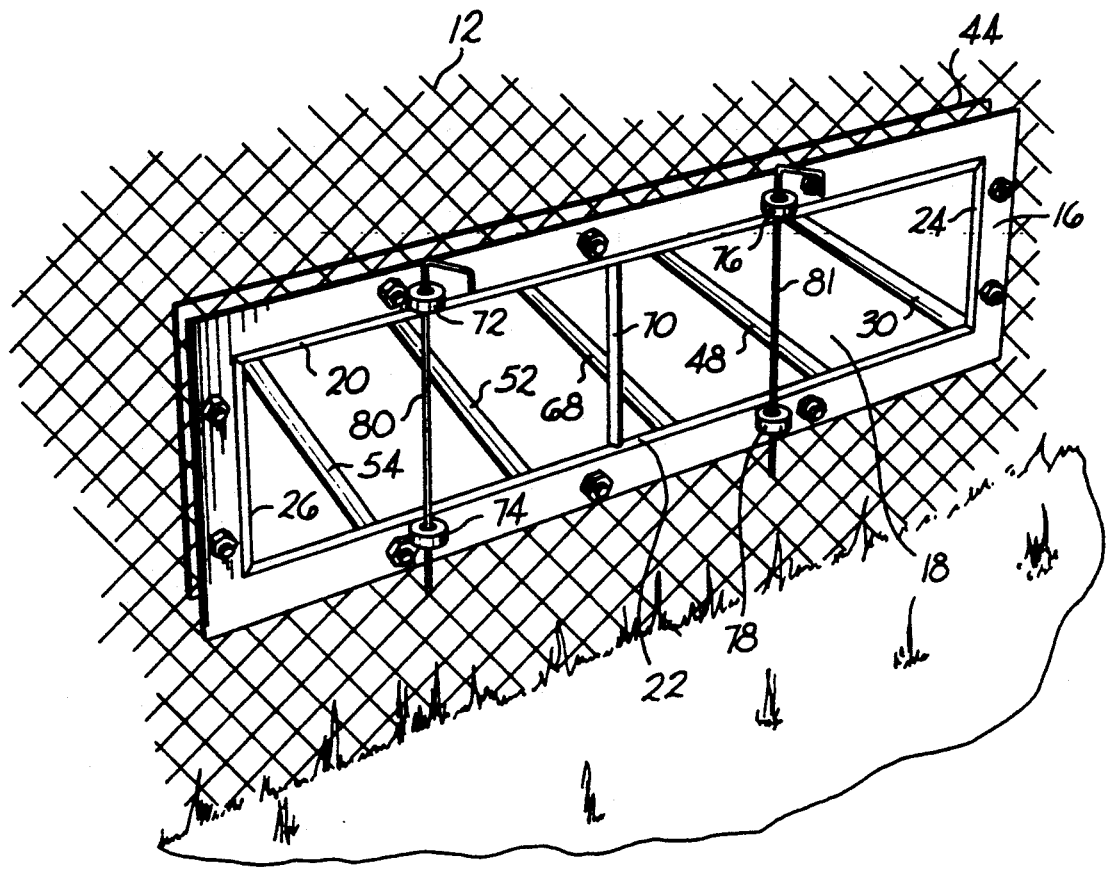
FIG. 2 is a front perspective view of the feeder.
Figure 3:
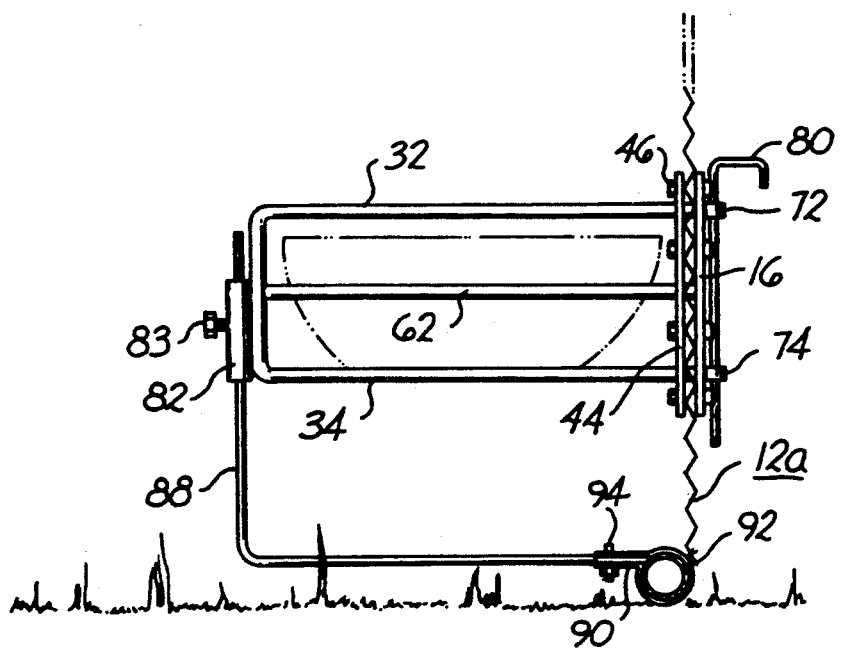
FIG. 3 is an end elevational view of the feeder mounted on a chain-link fence gate.

Referring now to the drawings, a fenced animal feeder 10 constructed in accordance with the present invention is illustrated in FIGS. 1 and 2 mounted in and carried by a chain-link fence 12, and mounted in a chain-link fence gate 12a in FIG. 3, the feeder including a cage 14 extending into the space of the enclosure or pen within which the animal (not illustrated) is confined. The feeder comprises a front frame member 16 constructed from galvanized steel or the like having a central substantially rectangular opening 18. Struts 20, 22, 24, 26 are formed together with the front frame 16 about the border of the opening 18 or may be formed separately as rods or bars and welded to the frame along the border of the opening 18. In either case the struts form the front of the cage 14 which includes a pair of rod struts 28, 30 at one end and another pair of rod struts 32, 34 at the other end, the struts 28 and 32 being offset inwardly relative to the ends for reasons which will become clear. The struts 28, 30, 32, 34 are welded at the front to respective front struts 20, 22, 24, 26 and to vertically and horizontally rear rod struts 36, 38 and 40, 42 respectively.

A second or rear frame member 44 also formed from galvanized steel includes a central substantially rectangular opening similar to the opening 18 but slightly larger by an amount substantially equal to the width of the struts 20, 22, 24, 26. The frame member 44 may be positioned so that the cage is received through the opening therein. Thus, the fence 12 or 12a may have a rectangular opening cut therein substantially equal to that of the opening in the frame 44, which may be used as a template therefor, and the cage may thereafter be slid through the opening in the fence until the front frame 16 abuts the front surface of the fence. Thereafter the rear frame 44 is slid onto the cage and into abutting relationship with the rear surface of the fence. Bolts 46 may then pass through aligned holes in the frame members 16, 44 to secure the front and rear frames together so as to sandwich and clamp the fence 12 therebetween.

The cage 14 additionally includes floor forming rod struts 48, 50, 52, 54, the spacing between adjacent floor struts being such as to support one or two feed dishes, one of which is illustrated in phantom at 56. To prevent the feed dishes from being extracted by the animal from the rear of the cage, the cage includes a substantially central horizontally extending rod strut 58 at the rear affixed to the vertically extending rear struts 36 and 38. Additionally, to preclude the feed dishes from being extracted at the ends of the cage, the cage includes horizontal end rod struts 60, 62 affixed to the vertically extending front and rear struts 24, 36 and 26, 38 respectively. To preclude the feed dishes from being extracted from the top of the cage, there are a pair of horizontally extending rod struts 64, 66 affixed to the horizontally extending from and rear struts 20 had 40 respectively. Thus, the feed dishes may only be inserted and removed from the front opening 18 of the frames 16, 44.

Preferably, the feeder of the present invention supports a pair of feed dishes and the cage thus includes a centrally located divider rod strut 68 secured to the rear central horizontal strut 58 and to a centrally disposed vertical rod strut 70 at the front, the strut 70 being affixed to the horizontal strut 58 and to a centrally disposed vertical rod strut 70 at the front, the strut 70 being affixed to the horizontally extending front rod struts 20 and 22. The divider strut 68 divides the cage in half so that two individual separate feeder dishes may be supported in each section, one dish being for food and the other for water.

To preclude the dishes from being pushed out at the front, there is provided a pair of spaced aligned ring members 72, 74 and 76, 78, each pair being substantially in the center of half of the opening 18 between a respective end and the strut 70. A respective hooked lock rod 80, 81 may be positioned respectively in the ring pairs 72, 74 and 76, 78 to place a removable obstacle in the respective half of the opening so that a dish may be removed only when the corresponding lock bar is removed.

Additional support for the cage may be provided to the feeder so that the rear of the cage does not sag especially when the animal is feeding or drinking. Thus, a sleeve 82 is welded to the rear of the cage, i.e., to the horizontally extending struts 42 and 58. The sleeve 82 includes a tapped hole through which a small bolt 83 is threaded. When the feeder is secured to a fence, as illustrated in FIG. 1, a rod 84 may be inserted through the sleeve, the rod preferably having a foot 86 for resting on the ground. With the foot positioned on the ground and the rear of the cage in the desired disposition, the bolt 83 may be tightened to secure the rod within the sleeve. When the feeder is to be attached to a gate, as illustrated in FIG. 3, an L-shape rod member 88 having one end positioned within the sleeve 82 and its other end affixed by welding to a strap 90 is provided. The strap 90 may be clamped about the bottom bar or pipe 92 of conventional chain-link fence gates and secured by a bolt and nut 94 so as to support the feeding cage against sagging.

In use, when food or water is to be provided to the animal, the appropriate lock rod 80 or 81 is pulled upwardly to provide access into the cage and a feed or water dish is inserted. The lock rod is then reinserted. When the dish is to be removed, the procedure is repeated. The animal cannot reach out or escape through the opening 18 because of the small spaces between the strut 70 and the lock rods, and cannot remove the dishes from the cage because of the various struts as aforesaid.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. An animal feeder for an animal pen having chain-link or similar wire rod fencing in which a rectangular aperture is formed, said feeder comprising first and second frames each having front and rear surfaces, wall means defining a substantially rectangular opening in each of said frames through the respective front and rear surfaces, a first plurality of rods secured to said first frame about said opening and extending rearwardly from said rear surface, said rods being disposed in an array of three groups defining a rectangle in a plane substantially parallel to said first frame for extending through said aperture when said rear surface of said first frame abuts said fence, a second plurality of rods disposed in a rectangular array spaced from and substantially parallel to said first frame secured to said first plurality of rods, said first and second plurality of rods defining a feeder cage with one group of said first rods forming a floor of said cage for supporting at least one feeder dish, a second group of said first rods forming ends for precluding removal of said dish at ends of said cage and a third group of said first rods forming upper rafters disposed above said floor for precluding removal of said dish at the top of said cage while permitting an animal to feed from said dish, at least one rod of said second plurality of rods being disposed for precluding removal of said dish through said rectangular array, closure means for selectively closing said opening in said front frame to preclude removal of said dish at the front of said cage selectively while permitting said dish to be inserted into and removed from said cage selectively, and means for clamping said second frame to said first frame with said first and second plurality of rods extending through the opening in said second frame and with said fence intermediate said first and second frames and the front surface of said second frame abutting said fence.

2. An animal feeder as recited in claim 1, including support means for holding said second plurality of rods against sagging downwardly relative to said frames.

3. An animal feeder as recited in claim 1, including rod means for dividing said cage into two sections for receiving a feeder dish in each section, said rod means including a rod extending from said opening in said first frame rearwardly and overlaying said floor for precluding moving a feeder dish laterally from one section to another.

4. An animal feeder as recited in claim 3, wherein said closure means comprises a removable lock rod selectively positioned in said opening in said first frame in front of each section.

5. An animal feeder as recited in claim 4, including support means for holding said second plurality of rods against sagging downwardly relative to said frames.

6. An animal feeder as recited in claim 5, wherein said support means includes a vertically disposed sleeve fixed to at least one rod of said second plurality of rods, a support rod disposed within said sleeve, a foot on said support rod for resting on ground in said pen, and means for adjustably securing said support rod within said sleeve.

7. An animal feeder as recited in claim 5, wherein said fencing includes a support bar disposed beneath said aperture, and said support means includes a vertically disposed sleeve fixed to at least one rod of said second plurality of rods, a support rod disposed within said sleeve, a bar connected to said support rod and to said support bar, and means for adjustably securing said support rod within said sleeve.

* * * * *